US007606658B2

(12) United States Patent
Wise et al.

(10) Patent No.: US 7,606,658 B2
(45) Date of Patent: Oct. 20, 2009

(54) FINANCIAL DECISION AID FOR 4-D NAVIGATION

(75) Inventors: John A. Wise, Glendale, AZ (US); Blake W. Wilson, Peoria, AZ (US); David Pepitone, Sun City West, AZ (US); Pavel Kolcarek, Brno (CZ)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/854,151

(22) Filed: Sep. 12, 2007

(65) Prior Publication Data

US 2009/0070123 A1 Mar. 12, 2009

(51) Int. Cl.
*G01C 21/10* (2006.01)
(52) U.S. Cl. .................. 701/204; 340/971; 340/439
(58) Field of Classification Search ................. 701/200
See application file for complete search history.

(56) References Cited

U.S. PATENT DOCUMENTS

| | | | |
|---|---|---|---|
| 3,088,107 A * | 4/1963 | Martienssen et al. ........ 701/120 |
| 4,019,702 A | 4/1977 | Annin |
| 4,159,088 A | 6/1979 | Cosley |
| 4,760,530 A | 7/1988 | Liden |
| 4,825,374 A | 4/1989 | King et al. |
| 4,827,417 A | 5/1989 | Berger et al. |
| 5,121,325 A * | 6/1992 | DeJonge ................ 701/123 |
| 5,272,638 A | 12/1993 | Martin et al. |
| 5,457,634 A | 10/1995 | Chakravarty |
| 5,504,686 A | 4/1996 | Lippitt et al. |
| 5,548,515 A | 8/1996 | Pilley et al. |
| 5,574,647 A | 11/1996 | Liden |
| 6,049,754 A * | 4/2000 | Beaton et al. ............... 701/204 |
| 6,266,610 B1 | 7/2001 | Schultz et al. |
| 6,828,921 B2 | 12/2004 | Brown et al. |
| 6,873,903 B2 | 3/2005 | Baiada et al. |
| 6,940,426 B1 | 9/2005 | Vaida |
| 7,188,007 B2 | 3/2007 | Boorman et al. |
| 7,219,011 B1 | 5/2007 | Barber |
| 7,228,207 B2 | 6/2007 | Clarke et al. |
| 7,302,338 B2 * | 11/2007 | Petzold et al. ............. 701/200 |
| 2003/0139876 A1 * | 7/2003 | Shinagawa ................. 701/204 |
| 2007/0032941 A1 | 2/2007 | Allen |
| 2007/0100538 A1 * | 5/2007 | Wise et al. ................. 701/200 |
| 2007/0103340 A1 | 5/2007 | Baranov et al. |
| 2007/0129854 A1 | 6/2007 | Sandell et al. |

\* cited by examiner

*Primary Examiner*—Thomas G Black
*Assistant Examiner*—Shelley Chen
(74) *Attorney, Agent, or Firm*—Ingrassia Fisher & Lorenz

(57) ABSTRACT

A method for facilitating a financial decision for 4-dimensional navigation of a vehicle includes receiving navigation information for the vehicle. A current location of the vehicle is determined. Data associated with at least one predetermined location of a plurality of predetermined locations is retrieved. A range of costs for said vehicle, representative of the at least one predetermined arrival time for the at least one predetermined location, is estimated. The range of costs is associated with a minimum value of the navigational information and a maximum value of the navigational information. An indicator representative of at least one cost of the range of costs is displayed.

20 Claims, 4 Drawing Sheets

FINANCIAL DECISION AID FOR 4-D NAVIGATION

TECHNICAL FIELD

The present invention relates to navigation and control systems, and more specifically, but not exclusively, to an improved navigation system and method that facilitates a financial decision for real-time, 4-dimensional navigation with the assistance of an operator display.

BACKGROUND

An air traffic management (ATM) system generally involves the mechanism (tools and personnel) by which an aircraft is controlled through a flight path. Future ATM systems, such as Eurocontrol's "ERASMUS" system and the FAA's "NGATS" system contemplate a more active role of the flight crew in relation to implementing and maintaining a certain amount of separation between aircraft.

It is anticipated that an increased flight crew role will lead to greater flexibility and better resource allocation with regards to aircraft control. However, there is currently no mechanism by which flight crews can quickly ascertain the financial impact that the decision made according to the increased flexibility afforded to them by their respective ATM system can have on the airlines. Accordingly, a need exists for such a mechanism by which flight crews can make intelligent navigational decisions having the benefit of knowing the possible financial impact.

BRIEF SUMMARY

In one embodiment, and by way of example only, a system for facilitating a financial decision for 4-dimensional navigation of a vehicle includes a processing unit, means for receiving navigation information, coupled to said processing unit, a data storage unit coupled to said processing unit, and a display unit coupled to said processing unit. The processing unit is operable to process the navigation information to determine a current location of the vehicle, retrieve at least one predetermined location of a plurality of predetermined locations, retrieve at least one predetermined arrival time for the at least one predetermined location, estimate, for the vehicle, a range of costs representative of said at least one predetermined arrival time for said at least one predetermined location, the range of costs associated with a minimum value of said navigation information and a maximum value of said navigation information, and display an indicator representative of at least one cost of the range of costs.

In another embodiment, again by way of example only, a method for facilitating a financial decision for 4-dimensional navigation of a vehicle includes receiving navigation information for the vehicle, determining a current location of the vehicle, retrieving data associated with at least one predetermined location of a plurality of predetermined locations, retrieving at least one predetermined arrival time for said at least one predetermined location, estimating, for the vehicle, a range of costs representative of the at least one predetermined arrival time for the at least one predetermined location, the range of costs associated with a minimum value of said navigation information and a maximum value of said navigation information, and displaying an indicator representative of at least one cost of the range of costs.

DETAILED DESCRIPTION

Figure 1:
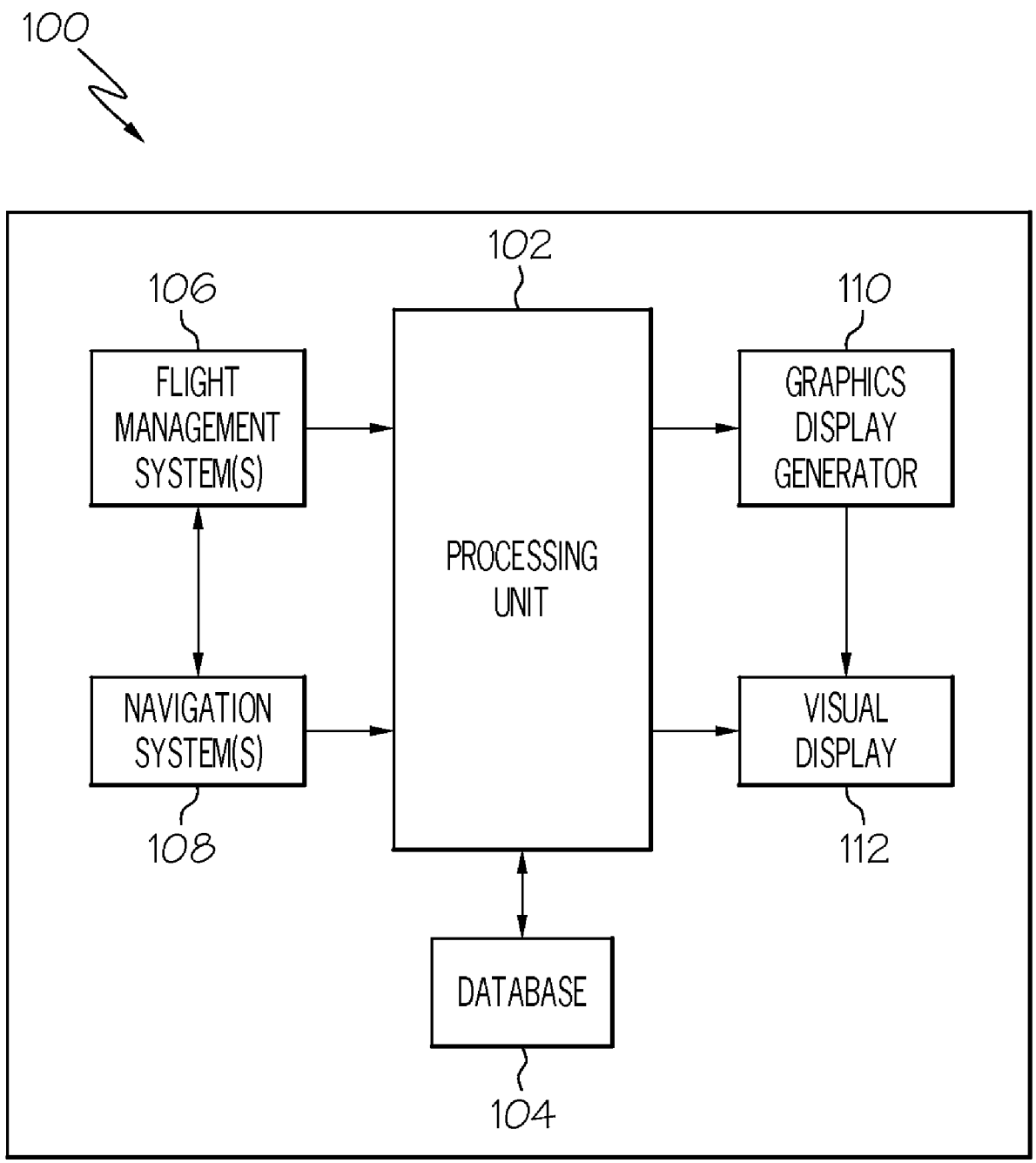
FIG. 1 is a block diagram of an example aircraft navigation and control system, which can be used to implement a preferred embodiment of the present invention.

The following detailed description is merely exemplary in nature and is not intended to limit the invention or the application and uses of the invention. Furthermore, there is no intention to be bound by any theory presented in the preceding background or the following detailed description.

In an aircraft's flight path, a certain degree of separation is required to be maintained between the respective aircraft and other aircraft. Such a requirement necessitates a system of maintaining aircraft separation, which has generally been handled by flight controllers on the ground. However, as mentioned previously, future air traffic management (ATM) systems (e.g., Eurocontrol's ERASMUS, FAA's NGATS) contemplate the flight crew as active real-time players in the aircraft separation process. For example, members of the flight crew may be asked to decrease or increase speed so as to cross a fix at a predetermined time to avoid a potential conflict.

While it is possible for high-end flight management systems (FMS) to be able to perform four dimensional (4-D) navigation (e.g., computing a vehicle's motion in four dimensions, such as three spatial dimensions and time), to date, a mechanism to assist the flight crew to make sure that 4-D navigation is accomplished in a way that is cost effective to the airline, is not available. Additionally, an ability to negotiate with ATM systems for a clearance that might result in the same separation consequence but cost the operator significantly less money is not presently in use. For example, while it may be physically possible for an aircraft (e.g., Delta 123) to be at an assigned a point at a given time, the cost of extra fuel burned may be financially excessive and the flight crew may want to offer to take a later slot to save fuel costs. Such fuel costs are generally forming an ever larger portion of an airline's bottom line, as fuel costs and the associated costs with processing the fuel increase.

In addition, most currently certified aircraft (including most military aircraft) do not have the ability in the FMS to automatically calculate the cost of the continually changing solution that results from the normal system variance in terms of 1) distance of clearance requirements and 2) the change of distance between the aircraft caused by differential winds and 3) the general variance in accuracy between the different FMSs. The following description and claimed subject matter serves as a mechanism to provide the flight crew with real time financial data relative to various maneuvers and their potential impact on mission cost.

The present description and following claimed subject matter utilizes an ergonomic 4-D cost display format that intuitively provides the flight crew with an innovative way of immediately recognizing if the current solution will provide a cost effective and safe solution. The system and symbology provides information relative to the overall cost impact (i.e., the Δ cost) to perform the task with the requested set of criteria (e.g., plus or minus different temporal or physical distances) versus the current or optimal performance criteria to allow the crew to better manage operating costs by being able to negotiate with air traffic control (ATC) for different completion criteria. For example Airline 123 may be requested to pass at five minutes (or five miles) after Waypoint 123 rather than at Waypoint 123. In addition, the system and its symbology may intuitively inform the crew if they will be able to accomplish the clearance within the operational tolerances of the aircraft (e.g., they use the maximum performance of the aircraft).

The described system, method, and computer program product can calculate costs based on the current price of the airlines fuel, the fuel burn per unit time based on environmental conditions, thrust, drag and bleed air requirements, and the amount of time the aircraft will need to maintain the power setting (derived from distance by dividing it by the ground speed). Other costs may be taken into account. Some of these other variables may include aircraft direct operating cost (DOC), crew costs, maintenance costs (e.g. engines and systems lifecycle costs), and additional constraints such as crew duty times. These other costs may be stored data items onboard the aircraft's database and be airline supplied.

An algorithm, operational as part of the system, method, and computer program product, may be able to incorporate these additional costs along with fuel burn to come up with the total cost for any changes to the aircraft's predicted arrival time. Additional functionality could be added to allow the crew to play 'what if' cost scenarios, should the crew choose to negotiate a different ATC clearance.

The total cost value described above may then be compared to the cost of not making that change over the same time period. The answer could be provided by a number of methods, but the simplest might be the delta between the nominal and the modified performance. For example, if the cost to get to "Bridge Intersection" as planned would be $5000, and if the requested change in flight parameters (e.g., a significant increase in speed) would cost $6000, then the system would indicate a delta cost of +$1000. On the other hand, if the requested change in flight parameters, e.g., a significant decease in speed) would cost $4500, then the system would indicate a delta cost of −$500.

A graphical user interface (GUI) can be configured for simplicity of use. To set up an exemplary process, the flight crew may first identify the point in space where they are supposed to be at a given time. They may then identify the location by which the maneuver must be completed (either temporal or geographic). In one embodiment, the system may then calculate and present a set of predictor cost indicators (e.g., Dollars or Euros and tick marks) which would depict delta cost if the maneuver will be completed relative to the clearance requirements, if no changes from current performance are made.

If the financial predictor box is too high, then the flight crew could negotiate for a lower cost option. In this case, the flight crew (or the FMS) could either decide to continue at their current rate, or slow down to meet the clearance at a much lower cost.

With reference now to the figures, FIG. 1 depicts a block diagram of an example aircraft navigation and control system 100, which can be used to implement a preferred embodiment of the present invention. Essentially, for this example embodiment, system 100 computes the movement of an aircraft in four dimensions (x, y, z, t), predicts its arrival time at a predetermined waypoint, and displays (in a highly intuitive format) a set of predictor cost indicators (e.g., Dollars or Euros and tick marks) which depict delta cost if a proposed maneuver will be completed relative to the clearance requirements if no changes from current performance are made, a maximum performance criteria is maintained, or a minimum performance criteria is maintained. The pilot then has the capability to interpret the delta cost indicators, and adjust the movement (e.g., speed, altitude, track, etc.) of the aircraft according to one or more performance criteria to achieve the desired financial impact.

For this example embodiment, system 100 includes a processing unit 102, a database 104, a flight management system 106, a navigation system 108, a graphics display generator 110, and a visual display 112. Notably, it should be understood that although system 100 appears in FIG. 1 to be arranged as an integrated system, the present description is not intended to be so limited and can also include an arrangement whereby one or more of processing unit 102, database 104, flight management system 106, navigation system 108, graphics display generator 110, and visual display 112 is a separate component or a subcomponent of another system located either onboard or external to an aircraft. Also, for example, system 100 can be arranged as an integrated system (e.g., aircraft display system, Primary Flight Display system, etc.) or a subsystem of a more comprehensive aircraft system (e.g., flight management system, navigation and control system, target aiming and control system, collision alert and/or avoidance system, weather avoidance system, etc.). Furthermore, the present description is not limited to aircraft displays, and system 100 can also be implemented for other types of vehicles' electronic displays, such as, for example, spacecraft navigation displays, ship navigation displays, submarine navigation displays, train navigation displays, motor vehicle navigation displays, etc.).

For the embodiment of system 100, processing unit 102 can be a computer processor such as, for example, a microprocessor, digital signal processor, or any suitable processor capable of at least receiving and/or retrieving aircraft flight management information (e.g., from flight management system 106), navigation and control information (e.g., from navigation system 108), terrain information, including waypoint data and coordinate data for airports, runways, natural and man-made obstacles, etc. (e.g., from database 104), generating display control signals for a visual display of the aircraft flight management information, the navigation and control information (including, for example, a zero pitch reference line, one or more heading indicators, tapes for airspeed and altitude, etc.), the terrain information, and sending the generated display control signals to a graphics display generator (e.g., graphics display generator 110) associated with an onboard visual display (e.g., visual display 112).

For example, processing unit 102 can be arranged as a single processor or plurality of processors connected to a data communications bus or system bus. A memory controller/cache can also be connected to the data communications bus or system bus, which can provide an interface between processing unit 102 and a local memory (e.g., RAM, ROM, etc.). A plurality of machine instructions can be stored in the local memory and retrieved and operated on by processing unit 102 to generate the control signals for the graphics display generator 110 and visual display 112. An Input/Output (I/O) bus bridge can also be connected to the data communications bus or system bus, which can provide an interface between processing unit 102 and an I/O bus. Thus, processing unit 102 can receive, retrieve and/or send data via such an I/O bus. In any event, those of ordinary skill in the art will appreciate that the hardware described herein for processing unit 102 in FIG. 1 may vary. As such, the depicted example is provided for illustrative purposes and not meant to imply any architectural limitations with respect to the present description.

For this example embodiment, system 100 also includes database 104 coupled to processing unit 102 (e.g., via an I/O bus connection). For example, database 104 can be a memory device (e.g., non-volatile memory, disk, drive, tape, optical storage device, mass storage device, etc.) that can store navigation information such as digital target location data, terrain data and waypoint data (e.g., latitudinal and longitudinal data) as either absolute coordinate data or as a function of an aircraft's position. A source for the digital target location data, terrain data, and/or waypoint data stored in database 104 can be, for example, a United States Geological Survey (USGS) map having a resolution of approximately 90 meters, which includes topographical relief information that can be used to apply grid lines following the contour of terrain. As such, database 104 can store a location database that includes data defining the actual geographical boundaries of numerous airports and runways.

Database 104 can also include additional navigation information, for example, a terrain database, which can include the locations and elevations of natural terrain obstacles such as mountains or other elevated ground areas, and also the locations and elevations of man-made obstacles such as radio antenna towers, buildings, bridges, etc. A terrain database stored in database 104 can also include, for example, the boundaries of restricted airspace, restricted elevations for particular airspace, bodies of water, etc. In yet another example, a terrain database stored in database 104 can be a Jeppesen-styled database, which can cover, for example, a 300 by 270 mile area of terrain and include topographical relief information. In still another example, airport and runway location data and terrain data stored in database 104 can be received from an onboard device that senses and maps man-made obstacles (e.g., airports, runways, etc.) and variations in terrain, such as, for example, a Forward Looking Infrared (FLIR) sensor, or an active or passive type of radar device. In another example, airport and runway location data, and other types of high priority target data (e.g., locations of incoming traffic to avoid, constructed waypoints, obstacles in the aircraft's flight path, etc.) can be retrieved and/or received by processing unit 102 from a suitable source of such data, such as, for example, an onboard flight management system database (e.g., a component of flight management system 106), an onboard navigation database (e.g., a component of navigation system 108), an onboard FLIR sensor or radar device, or an external database (e.g., via a data communication up-link).

Database 104 can also include, for example, a table of various direct and indirect costs, such as direct operating costs, crew costs, and crew duty times. The costs can include the aforementioned current or future price of fuel such as airline fuel, direct operating costs (DOC), crew costs, maintenance costs (i.e., engine and systems lifecycle costs), and the like. These costs may vary between specific aircraft, as one skilled in the art will appreciate that a large aircraft may be generally more expensive to operate than a smaller aircraft, for example. Such cost information may be construed in a relational database format, where, for example, the direct and/or indirect costs may vary according to parameters such as a particular flight path, time of day, number of passengers onboard, number of crew members assigned, exchange rates, and the like. As a result, such costs may be variable at any point in time, and may be calculated by system 100 according to the most current information available to the vehicle.

In addition to cost information specifically, database 104 can include other dynamic parameters, such as the aforementioned fuel burn per unit time based on particular environmental conditions, thrust, drag and bleed air requirements. Processing unit 102 may take one or all of such parameters into account in a repeating fashion such that the direct and indirect costs are reflective of the aircraft's current operating conditions. A particular dynamic calculation may include the amount of time that the vehicle will need to maintain a particular power setting, which can be calculated by dividing the distance to a particular waypoint by the vehicle's speed. As one skilled in the art will appreciate, such calculations of cost estimates and related parameters are limited only by the amount of data available to the processing unit 102, as well as system 100's data processing capabilities. Again, database 104, as well as other portions of system 100 may reside on board the vehicle, on a separate control system, or elsewhere.

For the depicted embodiment, system 100 also includes flight management system 106 and navigation system 108 coupled to processing unit 102 (e.g., via a respective I/O bus connection). Notably, flight management system 106 and navigation system 108 are depicted as separate components in the example embodiment of system 100. Alternatively, flight management system 106 and navigation system 108 and/or their functions of flight management, navigation and control can be combined in one system (e.g., in flight management system 106), or navigation system 108 can be a subsystem of flight management system 106. In any event, flight management system 106 and/or navigation system 108 can provide navigation data associated with the aircraft's current position and flight direction (e.g., heading, course, track, etc.) to processing unit 102. As such, navigation system 108 can include, for example, an inertial navigation system, a satellite navigation system (e.g., Global Positioning System) receiver, VLF/OMEGA, Loran C, VOR/DME, DME/DME, IRS, aircraft attitude sensors, or the navigation information can come from flight management system 106. The navigation data provided to processing unit 102 can also include information about the aircraft's airspeed, ground speed, altitude (e.g., relative to sea level), pitch, and other important flight information and/or performance criteria if such information is desired. In any event, for this example embodiment, flight management system 106 and/or navigation system 108 can include any suitable position and direction determination devices that are capable of providing processing unit 102 with at least an aircraft's current position (e.g., in latitudinal and longitudinal form), the real-time direction (heading, course, track, etc.) of the aircraft in its flight path, and other important flight information (e.g., airspeed, altitude, pitch, attitude, etc.).

For this embodiment, system 100 also includes graphics display generator 110 coupled to processing unit 102 (e.g., via an I/O bus connection) and visual display 112. Visual display 112 can also be coupled to processing unit 102 (e.g., via an I/O bus connection). For example, visual display 112 may include any device or apparatus suitable for displaying various types of computer-generated symbols and information, in an integrated, multi-color or monochrome form, representing one or more of pitch, heading, flight path, airspeed, altitude, targets, waypoints, terrain, flight path marker data, and notably, a graphical indication of the aircraft's progress in arriving at a predetermined location (e.g., waypoint) at a predetermined time. Using aircraft position, direction (e.g., heading, course, track, etc.), speed data retrieved (or received) from flight management system 106 and/or navigation system 108, wind data (e.g., speed, direction) and terrain (e.g., waypoint) data retrieved (or received) from database 104, processing unit 102 executes one or more algorithms (e.g., implemented in software) for determining the current position of the host aircraft, its heading (course, track, etc.), and computing a range of costs relating to a predetermined location (e.g. waypoint) based on the aircraft's current speed, including delta costs associated with a change in performance criteria (course, track, speed, altitude, etc.).

Processing unit 102 then generates a plurality of display control signals representing, among other things, a graphical indication showing the aircraft's total cost relating to arrival at a predetermined location (e.g., waypoint) at a predetermined time, and sends the plurality of display control signals to visual display 112 via graphics display generator 110. In one embodiment, visual display 112 may be an aircraft cockpit, multi-color display (e.g., a Primary Flight Display). Graphics display generator 110 interprets the received plurality of display control signals and generates suitable display symbols, which are presented on a screen or monitor of visual display 112.

Notably, although an existing cockpit display screen may be used to display the above-described flight information symbols and data, the present invention is not intended to be so limited and can include any suitable type of display medium capable of visually presenting multi-colored or monochrome flight information for a pilot or other flight crew member. As such, many known display monitors are suitable for displaying such flight information, such as, for example, various CRT and flat-panel display systems (e.g., CRT displays, LCDs, OLED displays, plasma displays, projection displays, HDDs, HUDs, etc.). For example, visual display 112 can be implemented as a heads-down Primary Flight Display by a DU-1080 Display Unit or DU-1310 Display Unit, which are color active matrix LCD-based devices produced by Honeywell International, Inc. of Morristown, N.J. Also, an example HUD that can be used for visual display 112 is the HUD2020 device also produced by Honeywell International, Inc.

For this example embodiment, graphics display generator 110 can be configured to provide to a screen or monitor of visual display 112 (e.g., responsive to operations of processing unit 102) at least visual symbols (e.g., in graph form) that represent the aircraft's total cost if no performance criteria (such as aircraft current speed) are changed, and delta costs if performance criteria are increased or decreased, for the aircraft to arrive at a predetermined time or for the aircraft to arrive at a predetermined location. The predetermined location data may include, for example, data retrieved or received from a navigation database, traffic and collision avoidance system, up-linked data from an external database, data from a FLIR sensor or radar device, and/or any other suitable source of location information useful to a pilot or other flight crew member. The current speed data may include, for example, data from an onboard inertial guidance system, navigation system, flight management system, etc. For this example embodiment, graphics display generator 110 (e.g., responsive to operations of processing unit 102) can render a multi-colored (or monochrome) image on a screen of visual display 112, of a plurality of symbols that indicate the aircraft's total current costs and delta costs, again relative to performance criteria and a predetermined location or time. Graphics display generator 110 (e.g., responsive to operations of processing unit 102) may also render multi-colored or monochromatic images of terrain and weather data on the screen of visual display 112.

Figure 2:
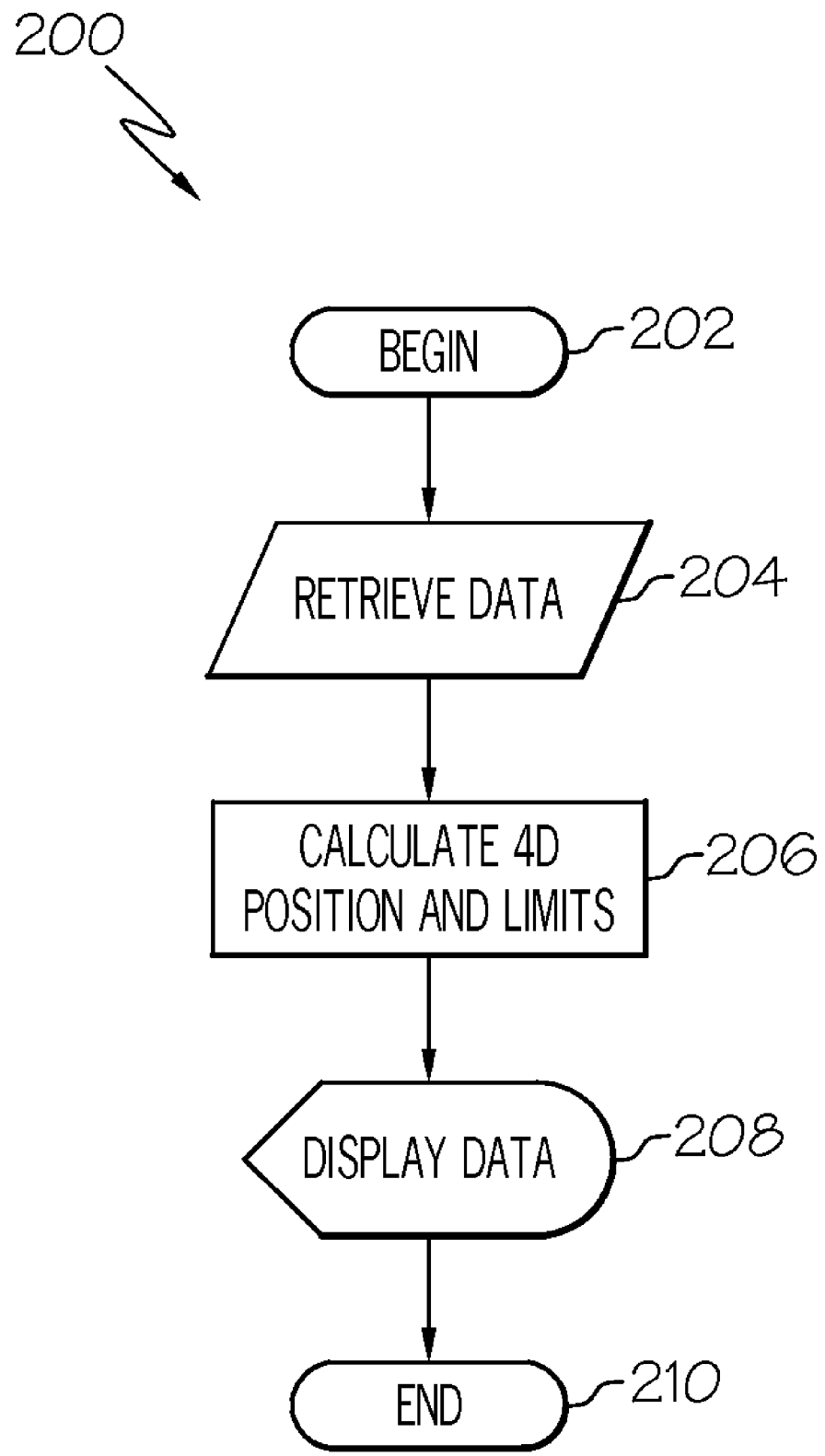
FIG. 2 is a flow chart showing an exemplary method for computing the movement of an aircraft in four dimensions, estimating a range of financial costs, and displaying on an electronic display the range of financial costs in relation to navigational options.

FIG. 2 is a flow chart showing an exemplary method 200 for providing financial information of an aircraft relating to four dimensional navigation, including predicting a total cost reflective of a change (if any) in performance criteria. The pilot can then adjust the movement (e.g., speed) of the aircraft in accordance with the indicators displayed, in order to achieve the desired total cost. In one embodiment, if the aircraft is incapable of performing a desired clearance (including a flight maneuver, for example) to reach a predetermined location or reach the predetermined location at a predetermined time in light of the available operational tolerances of the vehicle (e.g., the maximum performance criterion of the vehicle), then an indicator may be displayed that informs the pilot that the clearance for the particular desired maneuver is not reachable in light of the maximum performance criterion.

Method 200 begins (step 202) with the retrieval of related data (step 204), such as a predetermined location or a predetermined time, or including cost data such as the cost of fuel. The data may be retrieved for a specific, current clearance (referring to a request relating to a particular flight path, for example), or the data may be retrieved in advance of a new clearance. Once all of the relevant data has been retrieved into the respective processing component, then the system calculates the vehicle's four-dimensional position (e.g., three dimensional position with respect to time). In addition, the system calculates a total cost associated with the respective clearance, including delta costs with limits related to maximum and minimum performance criteria, such as a vehicle position at a certain time based on vehicle speed. The calculated cost values are then displayed to the flight crew (step 208). Method 200 then ends (step 210).

Figure 3:
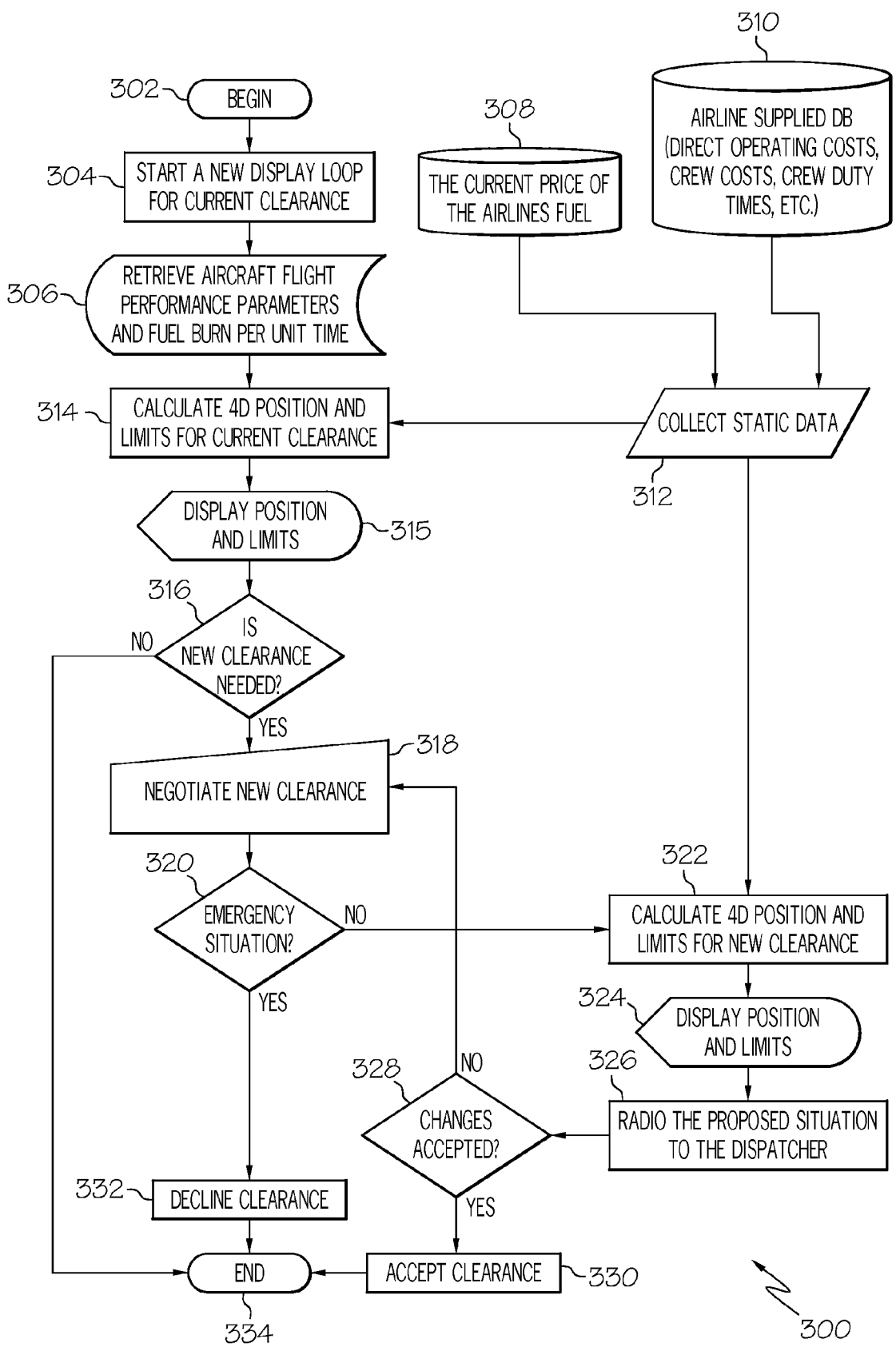
FIG. 3 is a flow chart showing a more detailed exemplary method of the method described in FIG. 2.

FIG. 3 is a flow chart which illustrates in greater detail the high-level method steps described above according to FIG. 2. Notably, FIG. 3 represents an exemplary method of facilitating financial decisions for 4-d navigation for a vehicle. As one skilled in the art will anticipate, steps of the described method may vary, may be omitted, or completed in a different order or priority than that shown. The depicted method 300 relates to an aircraft scenario, but again, the method may be adapted for other vehicles as previously described.

Method 300 begins (step 302) with the commencement of a new display loop relative to the current clearance of the vehicle. The current clearance may include, for example, a request by the ATM for an aircraft to pass at five miles after Waypoint 123 rather than at Waypoint 123 at a certain time. The system 100 (FIG. 1) may receive this information from the ATM and then begin to retrieve navigation information such as aircraft flight performance parameters, including a fuel burn per unit time (step 306). The system then calculates the aircraft's 4-D position and related costs, including delta cost limits, for the current clearance (step 314). This calculation or calculations may take a variety of parameters and inputs into account (represented here as collect static data block 312). In the depicted method 300, the current price of the airline's fuel (block 308), as well as airline supplied database information such as DOCs, crew costs, crew duty times, and the like (block 310) are collected. While block 312 refers to this data as "static," in some embodiments, particular portions of data may dynamically vary according to current operating conditions of the aircraft or vehicle. Once the aircraft's 4-D position and limits for the current clearance are calculated, the method 300 displays the aircraft's position and limits to the flight crew (step 315).

Figure 4:
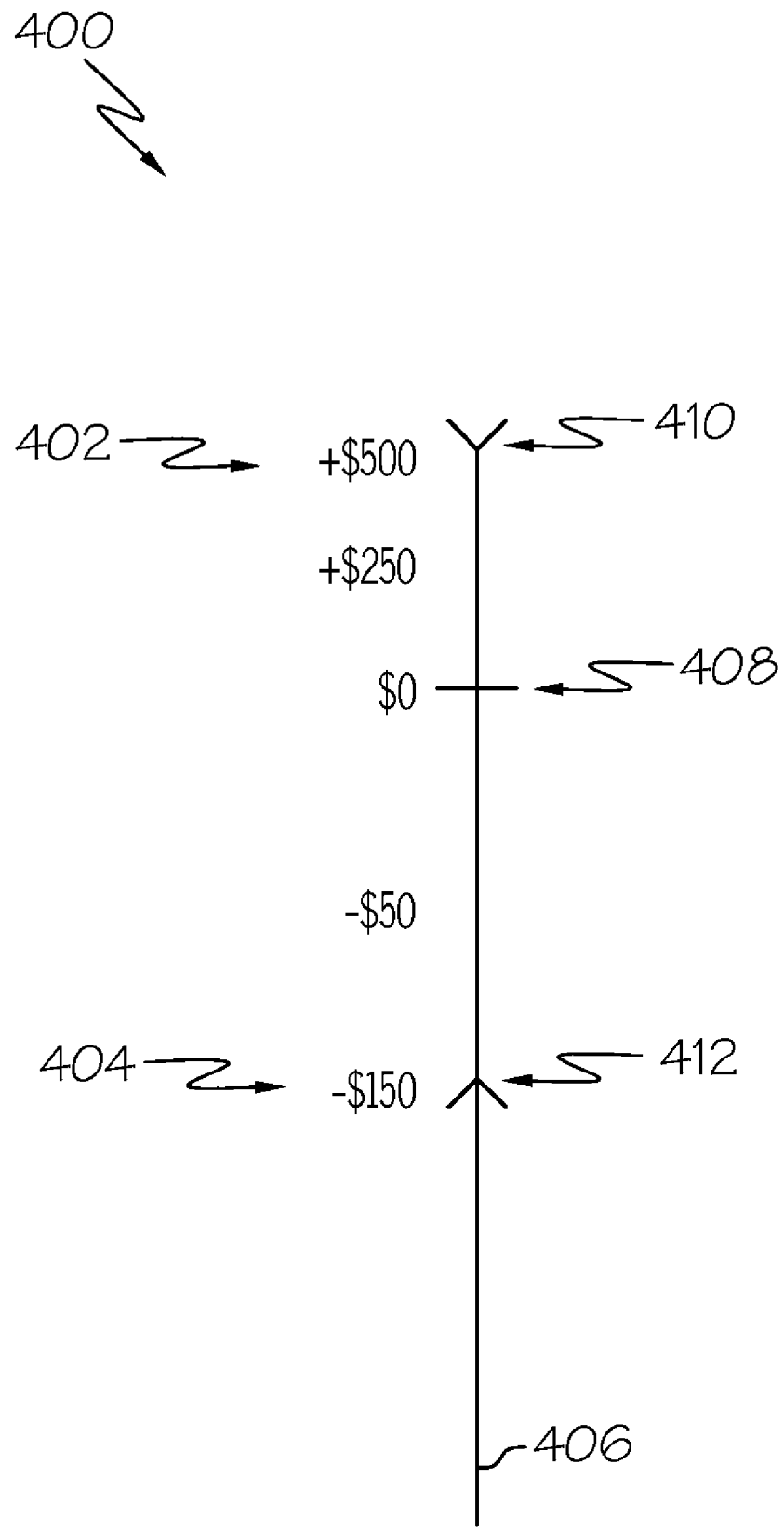
FIG. 4 is a pictorial representation of a portion of a visual display, which further illustrates the example method described in FIGS. 2 and 3.

Briefly turning to FIG. 4, a pictorial representation of such a graphical display of the aircraft's position and limits are displayed as part of GUI portion 400. As one skilled in the art will anticipate, a variety of presentation symbology may be utilized to indicate an aircraft position and cost factors. In the depicted embodiment, the upper delta cost limit 402 is shown as +$500 dollars for this particular clearance. The lower delta cost limit 404 is shown as −$150 dollars. Line 406 represents a geographical location of the aircraft. Again, however, line 406 may be configured to represent a timeline (e.g., minutes of flight time), or a line 406 may be shown representing a timeline and a second line 406 may be shown representing geographical location.

Indicator 408 represents a geographical location in which the aircraft will arrive at an assigned time, if no changes are made to the aircraft's performance criteria (such as speed). The "V" indicator 410 at the top portion of line 406 represents a geographical location in which, assuming that certain environmental factors don't change, but that the aircraft's performance criteria (again, such as speed) are maximized, the aircraft will arrive at the assigned time. In light of the method 300 example described previously, indicator 410 can indicate the geographical location of five miles past the Waypoint 123, according to the current clearance request. Alternatively, the geographical location of five miles past Waypoint 123 can separately be indicated by a symbol along the line 406.

Assuming that indicator 410 represents the five miles past Waypoint 123 location of the current clearance, the flight crew can quickly ascertain that compliance with the clearance request would incur a delta cost of about $500 to the airline. Returning to FIG. 3, method 300 then queries whether a new clearance is needed (step 316). In one embodiment, step 316 can represent two separate considerations. The first consideration may include an initial analysis by the system of whether the current clearance is achievable within the operational tolerances of the aircraft. This initial consideration of step 316 can be intended to be an automated function, or a manual indication to flight crew. In queering whether a new clearance is needed, the system may take a variety of parameters, including the aforementioned static and/or dynamic parameters, but also including environmental factors such as wind speeds and the like, into account. If it is determined that the current clearance is achievable (whatever the financial cost), then the second consideration of step 316 may be either an automated, manual, or hybrid process in which, in light of the financial data calculated by the system and provided to the crew, it is financially expedient to negotiate a new clearance. Accordingly, the process of negotiating a new clearance with the ATM system is begun (step 318).

If it is determined that a new clearance is desirable, method 320 queries whether the current conditions are emergency in nature (step 320). Such emergency conditions may require the pilot to disregard the current clearance in order to maintain the safety of his crew and the aircraft (step 332). Such an emergency condition would automatically be afforded priority status by an ATM system.

If an emergency situation is not present, method 300 then calculates, in light of the desired changes of the system and/or flight crew to the flight plan, the respective 4-D position and limits for the new clearance (step 322). The position and limits are again displayed to the flight crew (step 324). For example, returning to FIG. 4, the flight crew noted from the original display that a decrease in speed will result in a delta savings of $150 to the airline, while putting the aircraft in a geographical location of at least five miles ahead of Waypoint 123. In this manner, the aircraft remains 5 miles apart from Waypoint 123 (five miles ahead of Waypoint 123 instead of five miles beyond Waypoint 123). The flight crew may then have decided to decrease speed accordingly by a certain amount and negotiated this new clearance with the ATM system. The new display (not shown) would place the indicator represented by indicator 408 in FIG. 4 at the new geographic location corresponding to the new clearance. Again, the other respective delta cost limits would be shown.

In the depicted embodiment, the flight crew is able to identify the new geographic location of the new clearance with respect to Waypoint 123. If the flight crew approves of the change, the proposed situation is radioed to the dispatcher (controller) (step 326). If the changes are accepted (step 328), then the ATM and the FMS of the aircraft accept the new clearance (step 330). Method 300 then ends (step 334).

Again, the above described system, method, and variations thereof, intuitively facilitate the financial impact of particular decisions in the overall 4-D navigation process of a vehicle. It is important to note that while the present invention has been described in the context of a fully functioning navigation and control system and method, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular navigation and control system and method.

The description of the present invention has been presented for purposes of illustration and description, and is not intended to be exhaustive or limited to the invention in the form disclosed. Many modifications and variations will be apparent to those of ordinary skill in the art. These embodiments were chosen and described in order to best explain the principles of the invention, the practical application, and to enable others of ordinary skill in the art to understand the invention for various embodiments with various modifications as are suited to the particular use contemplated.

What is claimed is:

1. A system for facilitating a financial decision for 4-dimensional navigation of a vehicle, comprising:
   a processing unit;
   means for receiving navigation information, coupled to said processing unit;
   a data storage unit coupled to said processing unit; and
   a display unit coupled to said processing unit, said processing unit operable to process said navigation information to:
   determine a current location of said vehicle;
   retrieve at least one predetermined location of a plurality of predetermined locations;
   retrieve at least one predetermined arrival time for said at least one predetermined location;
   estimate, for said vehicle, a range of monetary costs associated with said at least one predetermined arrival time for said at least one predetermined location, said range of monetary costs establishing a minimum monetary value derived from said navigation information and a maximum monetary value derived from said navigation information; and
   generating display control signals that cause the display unit to render an indicator that includes at least one monetary cost differential point of said range of monetary costs, wherein a zero cost differential point represents said at least one predetermined location on the display, a maximum monetary cost differential point is a point on said display associated with one of said maximum value of said navigation information and said minimum value of said navigation information, and a minimum monetary cost differential point is a point associated with the other of said maximum value of said navigation information and said minimum value of said navigation information.

2. The system of claim 1, wherein said vehicle is an aircraft.

3. The system of claim 1, wherein said vehicle is at least one of a ship, submarine, train, bus, truck and automobile.

4. The system of claim 1, wherein said processing unit, said means for receiving navigation information, said data storage unit, and said display unit are located onboard an aircraft.

5. The system of claim 1, wherein said indicator includes a first symbol associated with a current speed of said vehicle, and a second symbol displaying said range of monetary costs.

6. The system of claim 1, wherein said indicator includes a first symbol associated with a current speed of said vehicle, a second symbol associated with a slower speed of said vehicle, and a third symbol associated with a faster speed of said vehicle.

7. The system of claim 1, wherein said predetermined time of arrival comprises a Required Time of Arrival.

8. The system of claim 1, wherein said display unit comprises at least one of a heads-up display and a heads-down display.

9. The system of claim 1, wherein said means for receiving navigation information comprises a flight management system.

10. The system of claim 1, wherein the navigation information further includes vehicle performance criteria.

11. A system for facilitating a financial decision for 4-dimensional navigation of a vehicle, comprising:
means for receiving navigation information;
means for determining a current location of said vehicle;
means for retrieving data associated with at least one predetermined location of a plurality of predetermined locations;
means for retrieving at least one predetermined arrival time for said at least one predetermined location;
means for estimating, for said vehicle, a range of monetary costs associated with said at least one predetermined arrival time for said at least one predetermined location, said range of costs establishing a minimum monetary value derived from said navigation information and a maximum monetary value derived from said navigation information; and
means for displaying at least one of said range of monetary costs, wherein an indicator is representative of at least one monetary cost differential point of said range of monetary costs, wherein a zero monetary cost differential point represents said at least one predetermined location, a maximum monetary cost differential point represents a point on said display associated with one of said maximum value of said navigation information and said minimum value of said navigation information, and a minimum monetary cost differential point represents a point associated with the other of said maximum value of said navigation information and said minimum value of said navigation information.

12. The system of claim 11, further comprising: means for displaying a first symbol associated with a current speed of said vehicle and a second symbol displaying said range of monetary costs.

13. A method of facilitating a financial decision for 4-dimensional navigation of a vehicle, comprising the steps of:
receiving navigation information for said vehicle;
from said navigation information:
determining a current location of said vehicle;
retrieving data associated with at least one predetermined location of a plurality of predetermined locations;
retrieving at least one predetermined arrival time for said at least one predetermined location;
estimating, for said vehicle, a range of monetary costs associated with said at least one predetermined arrival time for said at least one predetermined location, said range of monetary costs associated with a minimum value of said navigation information and a maximum value of said navigation information; and
displaying an indicator within said display that includes at least one monetary cost differential point of said range of monetary costs, wherein a zero monetary cost differential point represents said predetermined location within the indicator, a maximum monetary cost differential point is a point on said display associated with one of said maximum value of said navigation information and said minimum value of said navigation information, and a minimum monetary cost differential point is a point associated with the other of said maximum value of said navigation information and said minimum value of said navigation information.

14. The method of claim 13, wherein said vehicle is an aircraft.

15. The method of claim 13, wherein said vehicle is at least one of a ship, submarine, train, bus, truck and automobile.

16. The method of claim 13, wherein the displaying step comprises the steps of: displaying a first symbol associated with a current speed of said vehicle; and displaying a second symbol displaying said range of monetary costs.

17. The method of claim 13, wherein the displaying step comprises the steps of: displaying a first symbol associated with a current speed of said vehicle; displaying a second symbol associated with a slower speed of said vehicle; and displaying a third symbol associated with a faster speed of said vehicle.

18. The method of claim 13, wherein receiving navigation information further includes receiving performance criteria of the vehicle.

19. A computer program product, comprising:
a computer-usable medium having computer-readable code embodied therein for configuring a computer processor for facilitating a financial decision for 4-dimensional navigation of a vehicle, the computer program product comprising:
a first executable computer-readable code configured to cause a computer processor to receive navigation information for a vehicle;
a second executable computer-readable code configured to cause a computer processor to determine a current location of said vehicle;
a third executable computer-readable code configured to cause a computer processor to retrieve data associated with at least one predetermined location of a plurality of predetermined locations;
a fourth executable computer-readable code configured to cause a computer processor to retrieve at least one predetermined arrival time for said at least one predetermined location;
a fifth executable computer-readable code configured to cause a computer processor to estimate, for said vehicle, a range of monetary costs representative of said at least one predetermined arrival time for said at least one predetermined location, said range of monetary costs associated with a minimum value of said navigation information and a maximum value of said navigation information; and a sixth executable computer-readable code configured to cause a computer processor to render at least one cost differential point of said range of monetary costs on a display device, wherein a zero monetary cost differential point is said predetermined location rendered on the display device, a maximum monetary cost differential point is a point on said display device associated with one of said maximum value of said navigation information and said minimum value of said navigation information, and a minimum monetary cost differential point is a point on said display device associated with the other of said maximum value of said navigation information and said minimum value of said navigation information.

20. The computer program product of claim 19, further comprising:

a seventh executable computer-readable code configured to cause a computer processor to display a first symbol associated with a current speed of said vehicle and a second symbol displaying said range of monetary costs.

* * * * *